R. BULOW.
INTERCHANGEABLE BODY FOR AUTOMOBILE CHASSIS.
APPLICATION FILED JAN. 25, 1916.

1,248,410.

Patented Nov. 27, 1917.
3 SHEETS—SHEET 1.

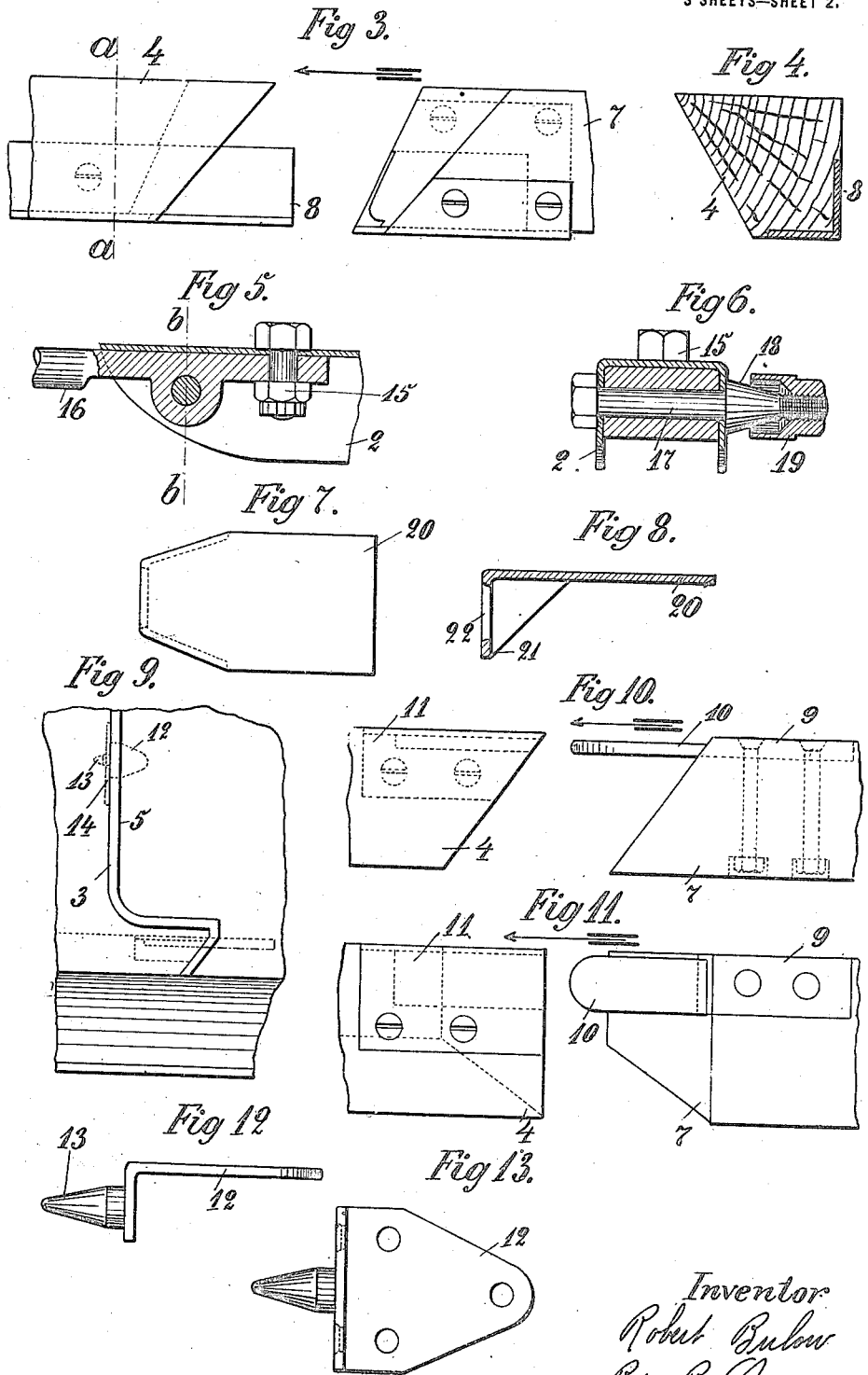

UNITED STATES PATENT OFFICE.

ROBERT BULOW, OF COPENHAGEN, DENMARK.

INTERCHANGEABLE BODY FOR AUTOMOBILE-CHASSIS.

1,248,410.      Specification of Letters Patent.     Patented Nov. 27, 1917.

Application filed January 25, 1916. Serial No. 74,212.

*To all whom it may concern:*

Be it known that I, ROBERT BULOW, residing at Knippelsbrogade 2, Copenhagen, Denmark, having invented certain new and useful Improvements in Interchangeable Bodies for Automobile-Chassis, do hereby declare the following to be a full and clear description of the same.

My invention relates to that type of device which permits of the substitution of a limousine body for a delivery, touring, roadster, or other type of body.

My invention aims to provide a fastening device especially adapted for retaining any of these bodies to the frame work of the automobile, so that it is practically impossible for any of them to become displaced, although one may be substituted for the other in a very short period.

My invention is disclosed in the accompanying drawings, in which

Figure 1:
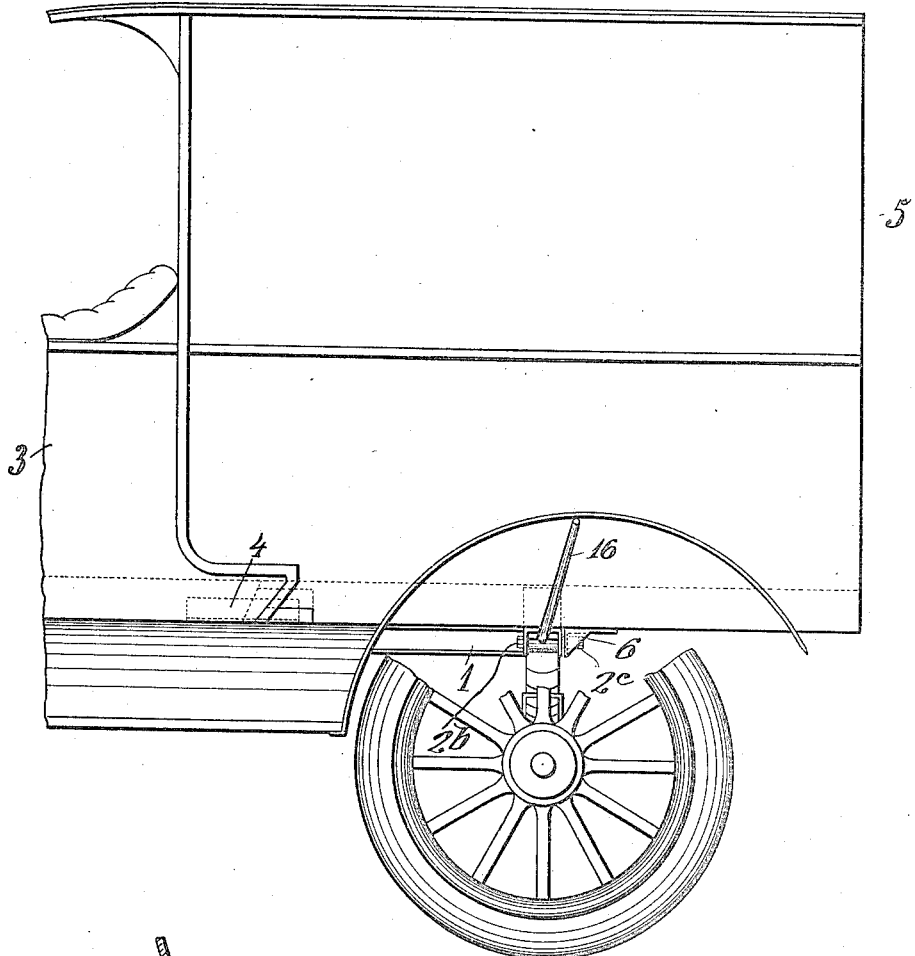
Figure 1 is a side elevation of an automobile.
Figure 2:
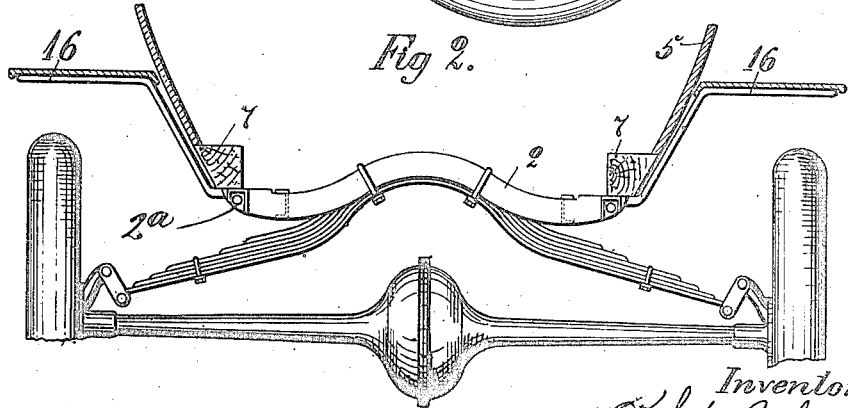
Fig. 2 is a rear elevation showing the body in section.

Fig. 3 my improved form of joint, which prevents the displacement of the body when once in applied position.

Fig. 4 discloses a runner, which in addition to preventing wear to the body upon being moved from and to the frame work also makes this operation more easily performed.

Figs. 5, 6, 7 and 8 disclose the device which I use to secure the body.

Figs. 9, 10, 11, 12, 13, 14, 15 and 16 are various views of my joints, which I use to prevent displacement, or movement of the forward, *i. e.* permanent part of the body with respect to the rear, *i. e.* removable part of the body.

Referring more particularly to the figures, 1 discloses part of the frame of the chassis; 2, a supporting bar which is provided with openings 2ª adapted to receive a bolt 2ᵇ provided with a nut 2ᶜ; 3, the permanent part of the body, *i. e.* the forward part which has a rearwardly extending portion 4 which forms part of my improved joint, hereinafter more particularly described, and 5 designates the body of a van provided with a lug 6, formed with an opening.

It will be noted that I have provided these various bodies with sills or runners 7, which facilitate their movement on to and off of the frame 1—2, Fig. 3.

In Figs. 3 and 4 I have, as aforestated, cut the end of sill 4 diagonally and the end of runner 7 in a manner to correspond to the end of the sill. It will be further noted that the lowermost portion of the runner 7 is adapted to project under the uppermost portion of sill 4. The end of the sill 4 is cut diagonally and is formed with two faces, one of said faces being positioned to the side and rear of the other, the runner 7 having its end cut to correspond, whereby any horizontal, as well as vertical shifting of the runner 7 with respect to the sill 4 is prevented. An optional form of joint is disclosed in Figs. 10 and 11. In these figures the sill 4 and runner 7 are cut diagonally similar to Fig. 3, but the sill 4 is provided with a recessed portion, into which is adapted to project the tongue 10 mounted upon the runner 7, when parts 4 and 7 have been brought into proper position.

Figure 14:
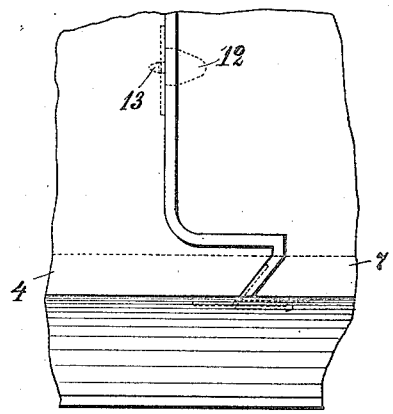
Figure 15:
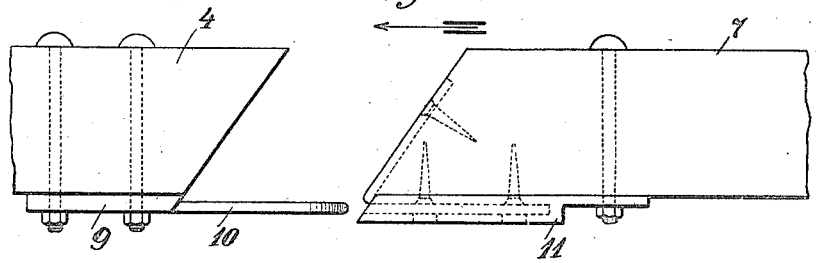
Figure 16:
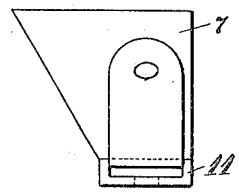

In Figs. 14, 15 and 16 I disclose my preferred form of joint. Similar to that shown in Figs. 3 and 10 I provide a diagonal cut to the sill 4 and the runner 7, these cuts to correspond one to the other. On the under side of the runner 7, I provide a socket 11 into which is adapted to project, when the sill 4 and runner 7 are in applied position, the tongue 10, secured to the sill 4 by means of a face plate 9. I have provided, as disclosed in Fig. 16, the runner 7 with a diagonal side cut, which corresponds to cut in sill 4, to further prevent side movement of the runner 7 with respect to the sill 4.

As disclosed in Figs. 12 and 13, I have provided a prong, adapted to be mounted, as disclosed in Fig. 14, at a position above the runner 7, to further insure the prevention of shifting movement of the removable body with respect to the fixed one. Secured to the supporting bar 2 is a bolt 17, of a form particularly adapted for the work for which I intend using same. This bolt is mounted on plates, which are secured to the supporting bar 2 by means of a bolt 15, which further retains a mud guard carrier 16 in applied position. Extending through the plates is the shank of the bolt 17, which is provided with a conical body portion 18, terminating in a threaded shank, upon which is mounted a nut 19.

Secured to the under side of the body is a bracket 20 provided with a down struck portion 21 in which is formed a conical opening corresponding to the body portion 18 and the bolt 17.

It will now be obvious that when I desire to secure a body to the chassis 1 that this may be accomplished by sliding the body by means of a runner 7, on to the frame work 1 and the cross bar 2 as far as possible. The screw threaded end of the bolt 17 will then project through the opening 22 of the bracket 20. When it is now desired to fixedly secure the removable body to the permanent frame the nut 19 will be mounted upon the screw threaded end of the bolt 17 and rotated, whereby the bracket 20 and bolt 17 will be drawn closer one to the other and as the bolt is fixedly mounted on the permanent part of the automobile and the bracket 20 mounted in the same fashion upon the removable body, these latter portions will be drawn one to the other, whereby the tongues 10 will be caused to enter the sockets 11, the diagonal cut of the runner 7 to be engaged by the corresponding cut 4 of the sill, the prong 13 mounted upon the body 5 to enter a corresponding recess in the rear of the seat 3 whereby the removable body will be retained in applied position.

A second way of securing the body to the chassis 1 is by sliding the body in the usual manner, by means of the runner 7 on to the frame work 1 and the cross bar 2 as far as possible. The lug 6 will then abut against the cross bar 2 at $2^a$ and a bolt $2^b$ will then be inserted through the opening, so that the screw threaded portion projects beyond $2^a$ and through the opening in the lug 6. A nut will then be secured to the screw threaded portion and upon the rotation of such nut the body will be drawn forwardly toward the stationary seat, the diagonal cut of the runner 7 being engaged by the corresponding cut 4 of the sills, thus forcing the former firmly upon the chassis, making it possible to rely solely upon the nut and bolt to retain the body proper in applied position. In connection with this it is pointed out that it is not necessary for applicant to limit himself to a diagonal cut for this purpose. Any suitable means which would engage the end of the runner 4 and upon being forced into position would tend to bring the end of runner 7 in to proper position, would be perfectly suitable for this purpose and applicant accordingly does not wish to limit himself to the specific means illustrated.

It should be borne in mind that numerous devices have been patented which allow of the removing of one form of automobile body and the substitution of another, but it is contended that none of these accomplish this end with the simplicity which marks applicant's device. It will be noted that all that is necessary to engage or disengage the removable portion from the permanent is to rotate the nuts 19 upon the screw threaded ends of the bolts 17 and thereafter simply pull the body rearwardly and away from the chassis.

Having thus described my invention, what I desire to claim is:—

1. A vehicle comprising a chassis, a sill fixedly secured to the chassis, a runner, a body mounted on said runner, means for drawing the runner and sill together, such means comprising a bolt mounted on the chassis, such bolt being provided with a conical shank and terminating in a screw-threaded end portion, a bracket secured to the body, such bracket being formed with an opening through which the end of the bolt is adapted to project, a nut for engaging the screw-threaded end portion of said bolt whereby, upon said nut being rotated, the runner and sill will be drawn together.

2. A vehicle comprising a chassis, a sill fixedly secured to the chassis, the rear end of said sill terminating in two faces non-parallel one to the other, a runner, a body secured to said runner, the end of said runner terminating in a corresponding cut to the end of the sill, and means for drawing the runner and sill together so as to form a tight joint and to prevent the movement of one with respect to the other.

3. A vehicle comprising a chassis, a sill fixedly secured to the chassis, the rear end of said sill terminating in two faces both of said faces being non-parallel and cut on a non-vertical plane, a runner, a body secured to said runner, the end of said runner terminating in a cut corresponding to the end of the sill, and means for drawing the end of the runner and the sill together so as to form a tight joint and prevent movement of one with respect to the other.

4. A vehicle comprising a chassis, a sill fixedly secured to the chassis, a cross bar secured to said chassis, such cross bar being provided with an opening, a runner, a body secured to said runner, the end of said sill and runner being adapted to abut when in applied position, a lug provided with an opening, secured to the under side of said body, and a bolt adapted to project through the opening formed in the cross bar and the opening in the lug, a nut adapted to engage the end of said bolt, whereby upon the rotation thereof the lug will be drawn toward the cross bar and as the former is secured to the body the runner will be drawn firmly against the sill.

5. A vehicle comprising a chassis, a sill fixedly secured to the chassis, a runner, a body secured to said runner, the ends of said runner and sill being constructed in such a manner that when they are drawn together the runner will be firmly forced into its proper position, a cross bar secured to the chassis, such cross bar being provided with openings, a lug formed with an opening and secured to the underside of the body, a bolt being adapted to project through the cross bar, and lug and a nut adapted to engage the end of said bolt which upon rotation of the same will tend to draw the sill and runners together and, by virtue of a coöperating structure, will draw the latter into firm seating engagement on the chassis.

ROBERT BULOW.

Witnesses:
 J. KNUDSEN,
 CHAS. THUDE.

Copies of this patent may be obtained for five cents each, by addressing the "Commissioner of Patents, Washington, D. C."